United States Patent
Kuchimanchi et al.

(10) Patent No.: US 12,484,595 B2
(45) Date of Patent: Dec. 2, 2025

(54) ORGANIC NATURAL CURDLING INGREDIENT

(71) Applicants: Venkata Satya Sarveswara Sairam Kuchimanchi, Secunderabad (IN); Vaishnavi Kuchimanchi, Secunderabad (IN)

(72) Inventors: Venkata Satya Sarveswara Sairam Kuchimanchi, Secunderabad (IN); Vaishnavi Kuchimanchi, Secunderabad (IN)

( * ) Notice: Subject to any disclaimer, the term of this patent is extended or adjusted under 35 U.S.C. 154(b) by 965 days.

(21) Appl. No.: 17/432,357

(22) PCT Filed: Oct. 1, 2019

(86) PCT No.: PCT/IN2019/050726
§ 371 (c)(1),
(2) Date: Aug. 19, 2021

(87) PCT Pub. No.: WO2020/234893
PCT Pub. Date: Nov. 26, 2020

(65) Prior Publication Data
US 2022/0183309 A1     Jun. 16, 2022

(30) Foreign Application Priority Data
May 20, 2019 (IN) .............................. 201941019993

(51) Int. Cl.
*A23C 19/02* (2006.01)
*A23C 1/12* (2006.01)
*C12N 1/20* (2006.01)

(52) U.S. Cl.
CPC ................ *A23C 19/02* (2013.01); *A23C 1/12* (2013.01); *C12N 1/20* (2013.01); *A23V 2400/113* (2023.08); *A23V 2400/137* (2023.08)

(58) Field of Classification Search
CPC .. A23C 19/02; A23C 1/12; C12N 1/20; A23V 2400/113; A23V 2400/137; A23L 3/16
USPC ......................................................... 426/48
See application file for complete search history.

(56) References Cited

U.S. PATENT DOCUMENTS 2,848,400 A    8/1958   Meier et al.

FOREIGN PATENT DOCUMENTS

| IN | 128KOL2006 A | | 6/2009 |
|---|---|---|---|
| JP | S63109736 A | * | 5/1988 |
| NO | 164917 B | * | 8/1990 |

OTHER PUBLICATIONS

IN 20040071112—English Abstract (Year: 2004).*
Ozcelik, S. et al. Food Sci. Technol. 73: 536-542 (Year: 2016).*
Nakano, S. et al. Bioresource Technol. 104: 791-794 (Year: 2012).*
Web-Search—Feb. 2, 2024 (Year: 2024).*
Ayyash, M, et al. (2013) Sodium chloride substitution of cheese. Human Health Handbooks: 6—pp. 545-566.—Abstract Only.
Horne D.S., et al. (2017) Rennet-induced coagulation of milk in P. L. H. McSweeney, P. F. Fox, P. D. Cotter & D. W. Everett (Eds.), Cheese. Chemistry, physics and microbiology (4$^{th}$ edition), pp. 115-143, San Diego, CA, USA: Academic Press—Abstract Only.
John, R.P., et al.; "Fermentative production of lactic acid from biomass: an overview on process developments and future perspectives"; Applied Microbiology and Biotechnology; vol. 74, pp. 524-534; 2007.
Nakano, S. et al; "Efficient production of D-(-)-lactic acid from broken rice by Lactobacillus delbrueckii using Ca(OH)2 as a neutralizing agent"; Bioresource Technology; vol. 104, pp. 791-794; 2012.—Abstract Only.
Notification of Transmittal of the International Search Report and the Written Opinion of the International Searching Authority, or the Declaration for International Application No. PCT/IN2019/050726, "An Organic Natural Curdling Ingredient", date of mailing: Dec. 13, 2019.
Ozcelik, S., et al; "Formation of lactic, acetic, succinic, propionic, formic and butyric acid by lactic acid bacteria"; LWT—Food Science and Technology; vol. 73, pp. 536-542; 2016.
Toldra F, et al., (2012) Strategies for Salt Reduction in Foods. Recent Patents on Food, Nutrition & Agriculture, 4, pp. 19-25.—Abstract Only.
Verma A K, Singh VP, Pathak V (2012) Effect of calcium chloride salt on the curdling of cross breed cow milk—a case report. Asian Journal of Science and Technology vol. 4, Issue, 12, pp. 028-031.
Wolfschoon-Pombo A F (1997) Influence of Calcium Chloride Addition to Milk on the Cheese Yield. International Dairy Journal 7, pp. 249-254.—Abstract Only.

* cited by examiner

*Primary Examiner* — Erik Kashnikow
*Assistant Examiner* — Bhaskar Mukhopadhyay
(74) *Attorney, Agent, or Firm* — Hamilton, Brook, Smith & Reynolds, P.C.

(57) ABSTRACT

In cheese production bacterial cultures secrets lactic acid and lowers the pH for promoting the curdling. However, longer incubation will increase the acidic condition followed by off flavor. "An Organic Natural curdling Ingredient" is produced by microbial fermentation of glucose obtained from the non-edible grain starches. The "microbial source" used is a consortium of two *Lactobacillus* sp. strains modified by way of strain improvement for product yield enhancement. Addition of 0.5 to 1% of this product reduces the incubation time and the acidic conditions. The major ingredient in "An Organic Natural curdling Ingredient" is a combination of naturally produced organic acids with mineral nutrient like calcium. The product has taste and texture improving efficiency by reducing the acidic flavor. Calcium is a valuable addition to the final product with high nutritional benefit in bio-available form.

15 Claims, 6 Drawing Sheets

ORGANIC NATURAL CURDLING INGREDIENT

This application is the U.S. National Stage of International Application No. PCT/IN2019/050726, filed Oct. 1, 2019, which designates the U.S., published in English, and claims priority under 35 U.S.C. § 119 or 365 (c) to Indian Application No. 201941019993, filed May 20, 2019. The entire teachings of the above applications are incorporated herein by reference.

FIELD OF THE INVENTION

The present invention deals with the natural curdling ingredient synthesized through the biological fermentation technology. This is an organic product with applications in the preparation of cheese, paneer, and dairy-related sweets. This enhances the taste and texture of the final product along with the bio-available nutritional value addition. The production or preparation time required for the curdling is reduced without affecting the final yield.

BACKGROUND OF THE INVENTION

Dairy products like cheese, paneer, and sweets are prepared from the coagulated milk. The process of curdling is generally performed by adding enzymes (rennet) (1) or acids or inorganic salts like magnesium, sodium, and calcium chloride. Each process has its own advantages and disadvantages. Along with the curdling method or the ingredient used, the container used for the curdling process also has a major effect on the taste of the final curdle. This will affect the cheese or sweets prepared from such coagulated milk. Copper kettles were replaced by stainless steel containers as a method of strategy to stop the copper particles mixing in curdle which will provide a fishy taste to the final product (2).

The rennet is obtained from the stomach of the ruminant animals like calves (1). It is a mixture of various enzymes majorly the chymosin a protease enzyme. Naturally, in ruminants, rennet helps in digestion of the mother's milk. As rennet is a protein its storage is always a critical issue to keep it in the active functional state. At the same time, the cost of rennet is high for the commercial production of curdling milk over the other approaches. Addition of salts to milk can be an alternative, however, the salty flavor of curdling will affect the final taste of the sweets and paneer, etc. Sodium chloride is initially used as the major inorganic salt in many food products for flavor, preservation, and milk curdling purposes. But sodium has many negative effects on long term consumption like hypertension, colorectal cancer, osteoporosis, kidney issues, and stroke, etc (3). Further world health organization also recommended minimizing the NaCl levels in foods. Therefore manufacturers are looking for substitutions like calcium chloride, magnesium chloride, and potassium chloride (4). $CaCl_2$ addition in the milk reported increasing the cheese yield, although it is not significant (5). Even though calcium is reported to place a major role in coagulation along with the milk proteins (6), its addition in inorganic salt form can cause the unfavorable taste to the final product.

General acid sources used for milk curdling process are lemon juice, orange juice, and vinegar. The basic principle behind the curdling by this approach is the reduction of the pH i.e., development of the acidic condition in the milk. Proteins like casein in the milk are naturally available in the colloidal state in neutralized condition. Once the acid source is added to the milk, neutralized proteins will be disturbed and attracted to each other. This leads to the development of clumps commonly known as curds used for various products development by further separating from the liquid whey portion.

Especially in food products taste is an important parameter to get fruitful market price along with preparation methods. In curdling methods, cost-effective acid approach performed by the lime juice or vinegar have a drawback of acidic off flavor in the final product. This will reduce the product market gradually. Therefore there is a need for an alternative product which can meet all these requirements like low cost, natural, and organic. The product should keep the flavor and taste of the product intact along with easy handling nature.

The inventors' product "Organic Natural Curdling Ingredient" is an effective alternative for these issues with functions like yield enhancement, reducing the time required for the curdling process, increased taste and flavor of the final product.

SUMMARY OF THE INVENTION

The present invention relates to the natural curdling ingredient synthesized through the biological fermentation technology. This is an organic product with applications in the preparation of cheese, paneer, and dairy-related sweets. This enhances the taste and texture of the final product along with the bio-available nutritional value addition. The production or preparation time required for the curdling is reduced without affecting the final yield.

In one of the embodiment, the present invention relates to the "Organic Natural Curdling Ingredient" prepared from eco-friendly fermentation approach wherein carbohydrate sources obtained from non-edible grade organic cassava or wheat or maize are fermented using a microbial consortium of *Lactobacillus* spp that improves the taste and flavor of cheese, paneer, and sweets than the traditional approaches.

Another embodiment of the present invention relates to a process of production of an organic, natural curdling ingredient produced through microbial fermentation of natural carbohydrate sources followed by downstream processing steps including filtration and drying.

In another embodiment of the present invention, the "microbial source" used for fermentative production of this product is a bacterial consortium comprising of two *Lactobacillus* spp., namely *Lactobacillus delbruekii* NCIM 2365 and *Lactobacillus acidophilus* NCIM 2285, which were modified by the way of strain improvement through medium optimization experiments for product yield enhancement at the 'in house R&D section' of Prathista Industries Limited. These bacterial strains were originally procured from National Collection for Industrially Important Microorganisms (NCIM), at National Chemical Laboratory, Pune and were modified by way of strain improvement methods.

In another embodiment of the present invention, during the production process, the organic acids produced through fermentation are neutralized by dosing of calcium source and thereby providing calcium fortification in the product. The main components of "Organic Natural Curdling Ingredient" include lactates (96-98%), acetates (1-2%), and propionates (0-1%) fortified with calcium. The source of calcium is a nutritional enrichment to the final product with high bio-availability. This becomes a potential source for the calcium for the consumers especially for the calcium deficient members (like hypocalcemic and osteoporosis members). Rather than other approaches addition of "Organic Natural Curdling Ingredient" for milk curdling reduces the preparation time and does not reduce the pH of the preparation which provides an acidic taste to the final product.

In another embodiment of the present invention, "Organic Natural Curdling Ingredient" keeps the neutral pH conditions of the milk and promotes the coagulation of milk proteins. This is an effective approach for removing the acidic flavor developed by natural methods like acid treatment. The cheese, paneer, and sweets prepared from the "Organic Natural Curdling Ingredient" added curdle have the improved taste and flavor than the traditional approaches. This is a cost-effective approach in comparison with the enzyme-based rennet treatment method as well as the acid approach. An amount of 0.5-1% of the "Organic Natural Curdling Ingredient" is sufficient to fulfill the above-proposed parameters in the product.

DETAILED DESCRIPTION OF THE INVENTION

Figure 1:
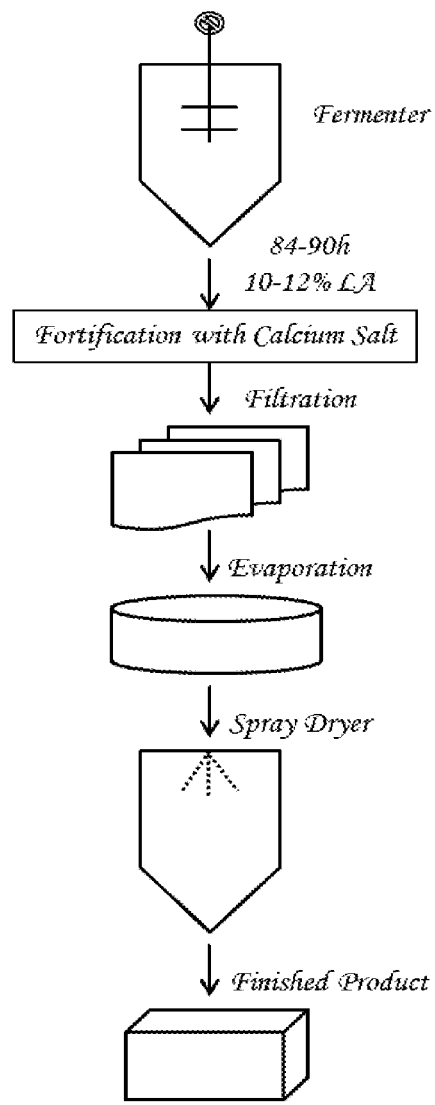
FIG. 1: The process flow diagram for the Organic Natural Curdling Ingredient.

The present invention relates to the natural curdling ingredient synthesized through the biological fermentation technology. This is an organic product with applications in the preparation of cheese, paneer, and dairy-related sweets. This enhances the taste and texture of the final product along with the bio-available nutritional value addition. The production or preparation time required for the curdling is reduced without affecting the final yield.

In one of the embodiment, the present invention relates to the "Organic Natural Curdling Ingredient", which is prepared from eco-friendly fermentation approach wherein carbohydrate sources obtained from non-edible grade organic cassava or wheat or maize are fermented using a microbial consortium of *Lactobacillus* spp that improves the taste and flavor of cheese, paneer, and sweets than the traditional approaches.

Another embodiment of the present invention relates to a process of production of an organic, natural, curdling ingredient produced through microbial fermentation of natural carbohydrate sources followed by downstream processing steps including filtration and drying.

In another embodiment of the present invention, the "microbial source" used for fermentative production of this product is a bacterial consortium comprising of two *Lactobacillus* spp., namely *Lactobacillus delbrueckii* NCIM 2365 and *Lactobacillus acidophilus* NCIM2285, which were modified by the way of strain improvement through medium optimization experiments for product yield enhancement at the 'in house R&D section' of Prathista Industries Limited. These bacterial strains were originally procured from National Collection for Industrially Important Microorganisms (NCIM), at National Chemical Laboratory, Pune and were modified by way of strain improvement methods. *Lactobacillus delbrueckii* 2365 was deposited on Feb. 6, 2025, and assigned Accession Number MTCC 25893 and *Lactobacillus acidophilus* 2285 was deposited on Feb. 6, 2025 and assigned Accession Number MTCC 25892. These lab-improved deposited under the Budapest Treaty at the Microbial Type Culture Collection & Gene Bank, CSIR-Institute of Microbial Technology, Sector 39-A, Chandigarh 160036 India.

In another embodiment of the present invention, during the production process, the organic acids produced through fermentation are neutralized by dosing of calcium source and thereby providing calcium fortification in the product. The main components of "Organic Natural Curdling Ingredient" include lactates (96-98%), acetates (1-2%), and propionates (0-1%) fortified with calcium. The source of calcium is a nutritional enrichment to the final product with high bio-availability. This becomes a potential source for the calcium for the consumers especially for the calcium deficient members (like hypocalcemic and osteoporosis members). Rather than other approaches addition of "Organic Natural Curdling Ingredient" for milk curdling reduces the preparation time and does not reduce the pH of the preparation which provides an acidic taste to the final product.

In another embodiment of the present invention, "Organic Natural Curdling Ingredient" keeps the neutral pH conditions of the milk and promotes the coagulation of milk proteins. This will be an effective approach for removing the acidic flavor developed by natural methods like acid treatment. The cheese, paneer, and sweets prepared from the "Organic Natural Curdling Ingredient" added curdle have the improved taste and flavor than the traditional approaches. This is a cost-effective approach in comparison with the enzyme-based rennet treatment method as well as the acid approach. An amount of 0.5-1% of "Organic Natural Curdling Ingredient" is sufficient to fulfill the above-proposed parameters in the product.

The present invention is further explained by the following examples. However, the present invention is not limited to these examples in any manner. The following examples are intended to illustrate the working of disclosure and not intended to take restrictively to apply any limitations on the scope of the present invention. Those persons skilled in the art will understand that the equivalent substitutes to the specific substances described herein, or the corresponding improvements are considered to be within the scope of the invention.

EXPERIMENTAL DETAILS & RESULTS

Example 1

(a) Upstream Process and Parameters:

A microbial consortium comprising of two lab-adapted strains of *Lactobacillus* spp., namely, *Lactobacillus delbruekii* NCIM 2365 and *Lactobacillus acidophilus* NCIM 2285 were used for anaerobic fermentation carried out at 45±2° C. on a synthetic medium containing 150 g/L glucose, 0.6 g/L yeast extract, 0.3 g/L potassium dihydrogen phosphate, 10 mg/L di-potassium hydrogen phosphate and 10 mg/L magnesium sulphate. Medium (without glucose) was heat sterilized at 121° C. and 15 psi for 25 min in an autoclave. Glucose was sterilized separately at 115° C. for 15 min and added aseptically to the rest of the medium.

Sterile nitrogen gas was flushed at 0.3 L/min into the headspace of the reactor using a sterile 0.2 μm pore sized PTFE filter (Axiva® 200050 RI, AXIVA Sichem Biotech Pvt. Ltd., India), to maintain anaerobic condition throughout this fermentation step. The pre-sterilized fermentation medium in the bioreactor was inoculated with 10% of inoculum from 48 h grown static flask culture. The seed culture was prepared in 500 mL Erlenmeyer flasks, incubated at 45° C. under anaerobic conditions in anaerobic S.S. jars with the help of Whitley Jar Gassing System (Don Whitley Scientific Limited, UK).

| | |
|---|---|
| pH: | 6.0 ± 0.2 |
| Temperature: | 45 ± 2° C. |
| Agitation (RPM): | 100 |
| Nitrogen: | 0.3 L/min |

The temperature was controlled at 45° C., and pH was maintained at 6.0 using 4N HCl and 4N NaOH or ammonium hydroxide in full strength. Temperature and pH were monitored using temperature and pH probe, respectively (Sartorius). After 84 to 90 h of fermentation, complete glucose is consumed and Lactic acid concentration of 10-12% is achieved in the fermented broth.

The cell growth during fermentation was measured in terms of optical density using UV-Vis spectrophotometer at a wavelength of 600 nm, in 3 mL of cuvettes. For dry cell weight estimation, 10-15 mL of fermentation broth was centrifuged at 10,000 rpm for 10 min in a pre-weighed empty falcon tube and dried at 60° C. under vacuum till constant weight was achieved. The dry weight of cells was calculated from the substitution of final falcon weight containing cells with the pre-weighed empty falcon weight.

Example 2

(b) Downstream Processing and Product Recovery

Immediately upon the surge of Lactic acid production along with other acids, neutralization step was performed through fortification with pre-sterilized 20% calcium carbonate slurry for the formation of calcium enriched organic salts. As the maximal production of organic acids and complete utilization of Glucose was achieved within 84 h of fermentation, a typical production batch was terminated between 84-90 h of fermentation. Further filtration was performed through 0.3 to 0.4-micron size cloth filters in a plate and frame filtration assembly. The filtered product was concentrated by evaporation and extraction of precipitates followed by homogenization with demineralized water at a high temperature of 95 to 100° C. The slurry was then subjected to spray drying process through the feed inlet at a temperature of 200° C. to obtain "An Organic Natural Curdling Ingredient" with desired organic acids levels. The upstream and downstream process has been depicted as a flow chart in FIG. 1.

Example 3

(c) Estimation of Organic Acids

Yields of the organic acids formed were analyzed in the in process samples as well as finished product samples by High-Performance Liquid Chromatography (HPLC) based method. The total organic acids present in the 0.1 g of the test sample was calculated by dissolving in 100 mL of the suitable solvent (8 mM of sulfuric acid in water as a mobile phase). Followed by 0.22 μm filtration and degassing was performed with the sonicator to prepare the test sample vials. These samples were analyzed with reference to analytic reference standards of respective organic acids.

Further samples are analyzed by injecting 20 μL of the prepared samples into the HPLC (Shimadzu LC2010CHT) system. Organic acids column (250×4.6 mm) was used by maintaining column temperature at 30° C. against 8 mM sulfuric acid in water mobile phase. The flow rate was maintained at 0.5 mL/min. while the total run time was 35 min. Detection was performed through UV/Vis at 215 nm.

The standards were injected using the same conditions at concentrations ranging from 2 mM to 20 mM to create a standard curve. Using a spreadsheet application the peak areas of the standards against their concentration were plotted. Further the slope and intercept of the least squares regression line were determined. Checked the line for linearity and discarded the low or high points that are not linear. The test samples were ensured that their absorbance falls within the range of the linear standard concentrations.

Using the Shimadzu Lab Solutions Software, the concentration of respective organic acids in a test sample are determined with reference to the standard calibration curve of respective organic acids in terms of difference of sample peak area and the intercept of gradient of organic acids plotted against the slope of standard curve for each of the individual organic acids.

Example 4

(d) Validation of Natural Curdling Ingredient for Milk Curdling

The "Organic Natural Curdling Ingredient" produced through fermentation process was assessed for its curdling ability as follows. Different concentrations of "Organic Natural Curdling Ingredient" ranging from 0.25%, 0.5%, 1%, 2%, and 3% were mixed with 50 mL of boiled milk and the time taken for coagulation was noted for each concentration. Acid sources like lime juice and vinegar (in mL) as well as inorganic salts like $CaCl_2$) and NaClare used as positive controls. While the milk without adding any curdling ingredient served as a negative control. Further, curdle was separated from whey with the help of cheesecloth. The pH of the curdle suspension before sieving in cloth, the volume of the whey generated, weight of the produced curdle, morphological characters of the curdle like colour, texture, and taste are recorded. An experiment was performed in triplicates and the data was statistically analyzed on the requirement basis for the significant study.

Figure 2:
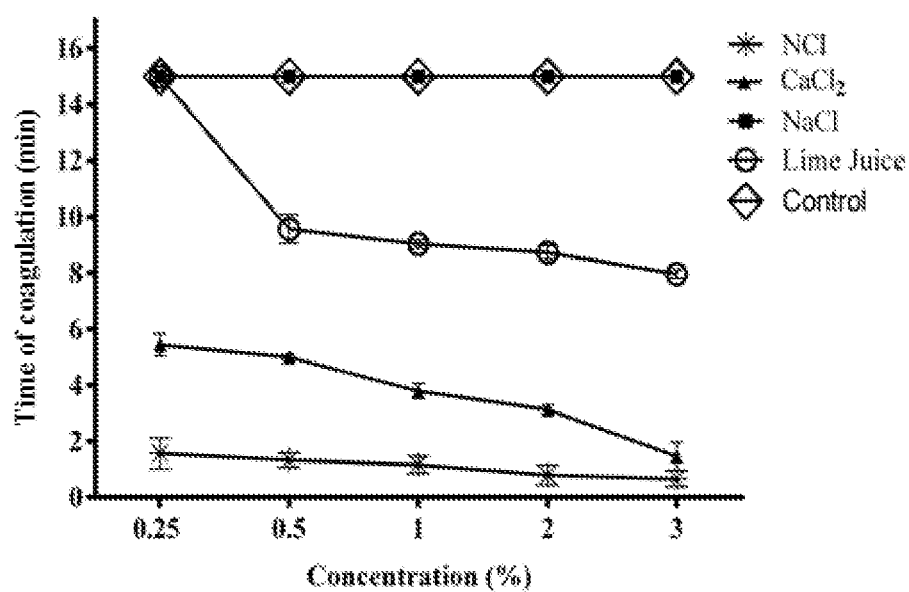
FIG. 2: The time of coagulation of cow milk in the presence of Organic Natural Curdling Ingredient in comparison to other ingredients.
Figure 3:
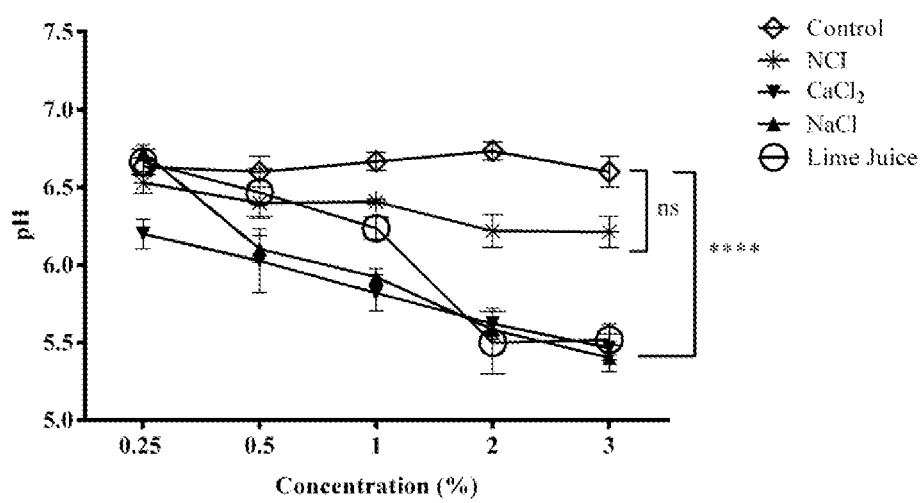
FIG. 3: The pH of coagulated suspension of cow milk by Organic Natural Curdling Ingredient and other ingredients.
Figure 4:
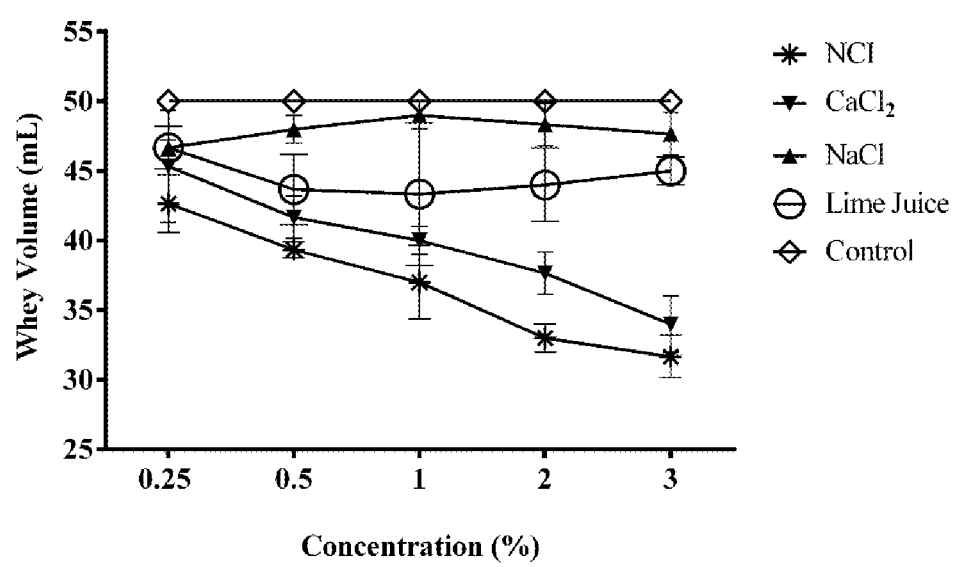
FIG. 4: Volume of whey produced by coagulation of cow milk in the presence of Organic Natural Curdling Ingredient in comparison to other ingredients.
Figure 5:
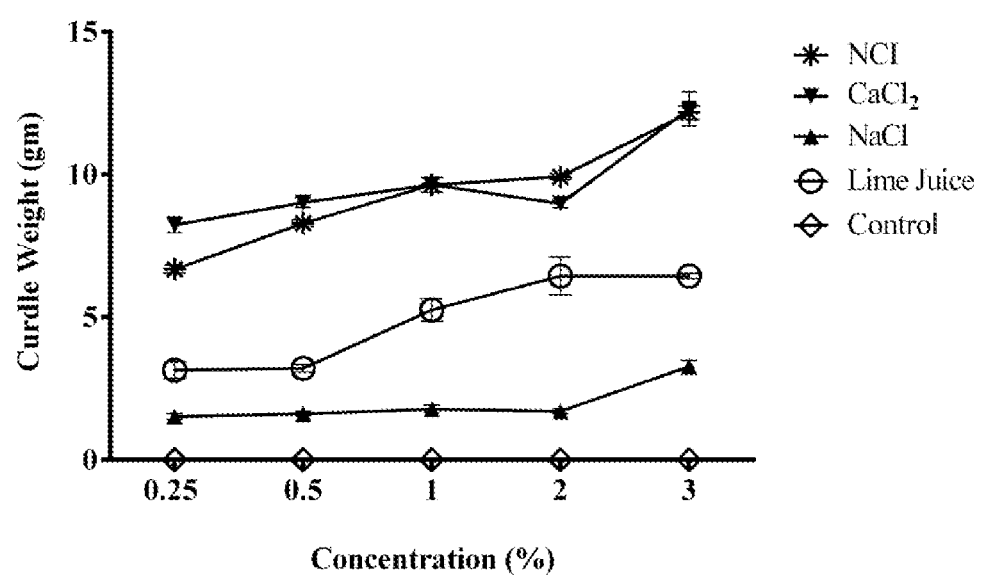
FIG. 5: Curdle weight produced by the coagulation of cow milk in the presence of Organic Natural Curdling Ingredient.
Figure 6:
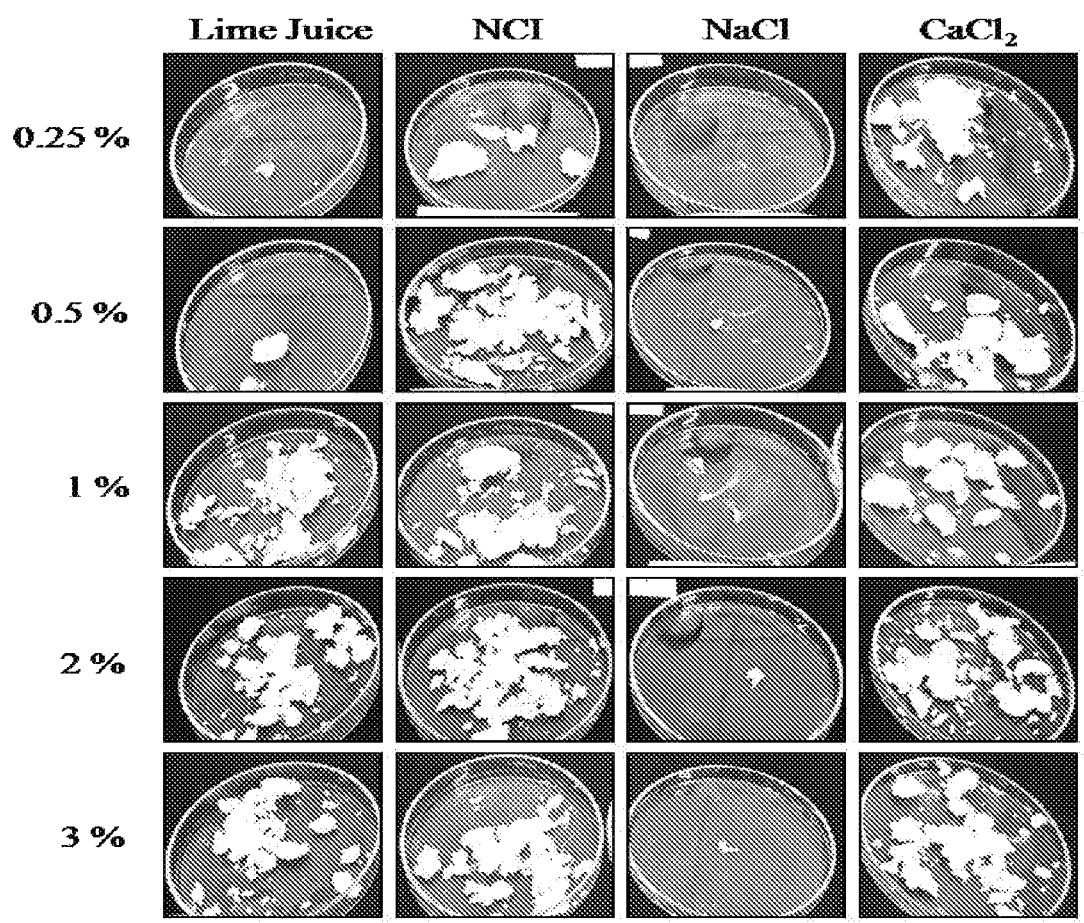
FIG. 6: Comparative representative image of curdling produced from the cow milk in the presence of Organic Natural Curdling Ingredient and others.

The time of coagulation for milk was low in case of Natural Curdling Ingredient (NCI) out of all the ingredients tested. As the concentration or volume of the NCI, $CaCl_2$, and lime juice increased the time required for coagulation of milk was reduced. While in case of control milk where no coagulant was added and in the case of NaCl, there is no coagulation even the concentrations increased (FIG. 2). The pH of the final coagulated suspension was reduced in all samples as the concentration of coagulant increased. However, the pH decrease in the case of NCI and $CaCl_2$) was very low than the others (FIG. 3). The whey volume produced and curdle generated are oppositely proportioned in NCI and $CaCl_2$ (FIG. 4). Highest curdle weight was recorded in the presence of these ingredients whereas lowest whey was generated (FIG. 5). In case of Lime Juice, the moderate curdle was developed followed by NCI and $CaCl_2$. In case of control no curdle or whey was generated the milk volume was represented in the line diagram. Overall the NCI and CaCl₂) added milk developed higher curdle yield in less time with minimal pH variation (FIG. 6).

The morphological parameters like taste, texture, and colour of the final curdle were also noted. In NaCl used milk, curdle was salty in taste and in case of lemon juice sour taste was found as the higher concentration reached. But in CaCl₂) used samples curdle had an off flavor to bitter. In NCI produced curdle the taste was good till 2% over which caused bitter flavortoo. In case of colour and texture, NCI showed white curdle with soft as well as smooth curdle over others. CaCl₂) produced curdle became hard at high concentration with creamy white colour. Overall our NCI showed best morphological parameters with a low time of coagulation along with higher curdle yield (Table 1).

TABLE 1

Morphological parameters like taste, texture, and colour of the curdle generated by Natural Curdling Ingredient.

| Sample | 0.25% | 0.5% | 1% | 2% | 3% |
|---|---|---|---|---|---|
| Taste | | | | | |
| Lime Juice | Milky | Milky | Curdle | Curdle | Slightly Sour |
| NaCl | Slightly Salty | Slightly Salty | Slightly Salty | Salty | Salty |
| CaCl₂ | Off flavor | Off flavor | Slightly Bitter | Bitter | Bitter |
| NCI | Milky | Very good | Very good | Curdle | Bitter |
| Texture | | | | | |
| Lime Juice | Soft & Smooth | Soft & Smooth | Slightly hard | Slightly hard | Hard |
| NaCl | Soft & Smooth | Soft & Smooth | Soft & Smooth | Slightly hard | Slightly hard |
| CaCl₂ | Soft & Smooth | Soft & Smooth | Soft & Smooth | Soft & Smooth | Hard |
| NCI | Soft & Smooth | Soft & Smooth | Soft & Smooth | Soft & Smooth | Soft & Smooth |
| Colour | | | | | |
| Lime Juice | White | White | Creamy White | Creamy White | Creamy White |
| NaCl | White | White | White | White | White |
| CaCl₂ | White | White | White | Creamy White | Creamy White |
| NCI | White | White | White | White | White |

INDUSTRIAL APPLICABILITY OF THE INVENTION

"An Organic Natural Curdling Ingredient" is an effective ingredient in the preparation of cheese, paneer, and sweets like rasogolla, rasmalai, kalakand, chaimui, etc. It can target the diaryand sweets industries. "Organic Natural Curdling Ingredient" also increases the yield of curdling from the milk in less time. In addition to it enhances the taste, texture, and flavor of the final product.

REFERENCES CITED

1) Horne D S, Lucey J A (2017) Rennet-induced coagulation of milk in P. L. H. McSweeney, P. F. Fox, P. D. Cotter & D. W. Everett (Eds.), Cheese. Chemistry, physics and microbiology (4th edition), pp. 115-143, San Diego, CA, USA: Academic Press.
2) Meier W, Ammenhausen, Zublin P (1958) Method for the curdling of milk. In U.S. Pat. No. 2,848,400.
3) Toldra F, Barat J M (2012) Strategies for Salt Reduction in Foods. Recent Patents on Food, Nutrition & Agriculture, 4, pp: 19-25.
4) Ayyash M, Sherkat F, Shah N (2013) Sodium chloride substitution of cheese. Human Health Handbooks: 6-pp: 545-566.
5) Wolfschoon-Pombo A F (1997) Influence of Calcium Chloride Addition to Milk on the Cheese Yield. International Dairy Journal 7, pp. 249-254.
6) Verma A K, Singh V P, Pathak V (2012) Effect of calcium chloride salt on the curdling of cross breed cow milk—a case report. Asian Journal of Science and Technology Vol. 4, Issue, 12, pp. 028-031.

We claim:
1. An organic, curdling ingredient for preparing cheese, paneer or dairy-related sweets produced by microbial fermentation of carbohydrates and comprising: 96%-98% w/w lactates, 1%-2% w/w acetates, and 0-1% w/w propionates in the form of calcium salts,
   wherein the microbial fermentation is conducted by *Lactobacillus delbrueckii* 2365 and *Lactobacillus acidophilus* 2285.

2. A process for producing an organic, curdling ingredient as claimed in claim 1, wherein it is produced through microbial fermentation of carbohydrate sources obtained from non-edible grade organic cassava or wheat or maize followed by downstream processing steps including neutralization, filtration and drying.

3. The process as claimed in claim 2, wherein fermentation is carried out on a medium comprising of the following composition: 150 g/L glucose, 0.6 g/L yeast extract, 0.3 g/L potassium dihydrogen phosphate, 10 mg/L di-potassium hydrogen phosphate and 10 mg/L magnesium sulphate.

4. The process as claimed in claim 3, wherein the medium is heat sterilized at 121° C. and 1.03 bar (15 psi) for 25 min in the absence of glucose; glucose is autoclaved separately at 115° C. for 15 min and then added aseptically to the heat sterilized medium.

5. The process of claim 2, wherein the fermentation is carried out in a bioreactor in batch mode at a temperature of 45±2° C., pH 6.0±0.2, agitation rate of 100 rpm and nitrogen flow of 0.3 L/min.

6. The process of claim 3, wherein the fermentation is carried out in a bioreactor in batch mode at a temperature of 45±2° C., pH 6.0±0.2, agitation rate of 100 rpm and nitrogen flow of 0.3 L/min.

7. The process of claim 4, wherein the fermentation is carried out in a bioreactor in batch mode at a temperature of 45±2° C., pH 6.0±0.2, agitation rate of 100 rpm and nitrogen flow of 0.3 L/min.

8. The process of claim 2, wherein neutralization of organic acids produced through fermentation is carried out by dosing with a calcium source.

9. The process of claim 3, wherein neutralization of organic acids produced through fermentation is carried out by dosing with a calcium source.

10. The process of claim 4, wherein neutralization of organic acids produced through fermentation is carried out by dosing with a calcium source.

11. The process as claimed in claim 5, wherein the batch fermentation is terminated between 84 h-90 h of fermentation.

12. The process as claimed in claim 2, wherein filtration is carried out the through a 0.3-micron to 0.4-micron size cloth filter in a plate and frame filtration assembly.

13. The process as claimed in claim 2, wherein the filtered product is concentrated by evaporation and extraction of precipitates followed by homogenization with demineralized water at a high temperature of 95° C. to 100° C. to produce a slurry and spray drying the slurry through the feed inlet at a temperature of 200° C.

14. A method of preparing cheese, paneer or dairy-related sweets, comprising adding 0.5% to 1% percent by weight of the organic curdling ingredient of claim 1 into a preparation of cheese, paneer or dairy-related sweets, wherein the organic curdling ingredient reduces the incubation time and acidity of the cheese, paneer or dairy-related sweets.

15. A method of preparing cheese, paneer or dairy-related sweets, comprising adding 0.5% to 1% percent by weight of the organic, curdling ingredient of claim 1 into a preparation of cheese, paneer or dairy-related sweets, wherein the organic curdling ingredient reduces the incubation time and acidity of the cheese, paneer or dairy-related sweets.

* * * * *